(12) United States Patent
Kurasawa et al.

(10) Patent No.: US 11,449,732 B2
(45) Date of Patent: Sep. 20, 2022

(54) TIME-SERIES-DATA FEATURE EXTRACTION DEVICE, TIME-SERIES-DATA FEATURE EXTRACTION METHOD AND TIME-SERIES-DATA FEATURE EXTRACTION PROGRAM

(71) Applicant: NIPPON TELEGRAPH AND TELEPHONE CORPORATION, Tokyo (JP)

(72) Inventors: Hisashi Kurasawa, Tokyo (JP); Katsuyoshi Hayashi, Atsugi (JP); Akinori Fujino, Kyoto (JP); Takayuki Ogasawara, Atsugi (JP); Masumi Yamaguchi, Atsugi (JP); Shingo Tsukada, Atsugi (JP); Hiroshi Nakashima, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 870 days.

(21) Appl. No.: 16/330,346

(22) PCT Filed: Aug. 28, 2017

(86) PCT No.: PCT/JP2017/030743
§ 371 (c)(1),
(2) Date: Mar. 4, 2019

(87) PCT Pub. No.: WO2018/047655
PCT Pub. Date: Mar. 15, 2018

(65) Prior Publication Data
US 2019/0228291 A1  Jul. 25, 2019

(30) Foreign Application Priority Data

Sep. 6, 2016 (JP) .............................. JP2016-174065

(51) Int. Cl.
*G06N 3/04* (2006.01)
*G06N 3/08* (2006.01)
(Continued)

(52) U.S. Cl.
CPC .......... *G06N 3/0454* (2013.01); *G06F 17/16* (2013.01); *G06N 3/08* (2013.01); *G06N 5/02* (2013.01); *G06N 5/022* (2013.01)

(58) Field of Classification Search
CPC .......... G06N 3/0454; G06N 3/08; G06N 5/02; G06N 5/022; G06N 3/0445; G06N 3/0481; G06N 3/084; G06F 17/16
See application file for complete search history.

(56) References Cited

U.S. PATENT DOCUMENTS

| 11,308,423 B2 * | 4/2022 | Grehant ................. G06N 20/20 |
| 2005/0123053 A1 * | 6/2005 | Cooper .................. G11B 27/28 375/240.2 |

(Continued)

FOREIGN PATENT DOCUMENTS

| JP | H08212184 A | 8/1996 |
| JP | 2006-163521 A | 6/2006 |
| JP | 2014-063432 A | 4/2014 |

OTHER PUBLICATIONS

Lin, J., Keogh, E., Lonardi, S. and Chiu, B., "A Symbolic Representation of Time Series, with Implications for Streaming Algorithms". In proceedings of the 8th ACM SIGMOD Workshop on Research Issues in Data Mining and Knowledge Discovery. San Diego, CA. 2003.

(Continued)

*Primary Examiner* — Dac V Ha
(74) *Attorney, Agent, or Firm* — Harness, Dickey & Pierce, P.L.C.

(57) ABSTRACT

A time-series-data feature extraction device includes: a data processing unit that processes a received unevenly spaced
(Continued)

time-series-data group into an evenly spaced time-series-data group including omissions and an omission information group indicating presence or absence of omissions, based on a received input time-series data length and a received minimum observation interval; a model learning unit that learns a weight vector of each layer of a model with a difference between an element not missing in a matrix of the evenly spaced time-series-data group including omissions and an element of an output result of an output layer of the model being taken as an error, and stores the weight vector as a model parameter in a storage unit, the difference being; and a feature extraction unit that receives time-series data of a feature extraction target, calculates a value of the intermediate layer of the model with use of the model parameter stored in the storage unit by inputting the received time-series data of the feature extraction target into the model, and outputs the calculated value of the intermediate layer as a feature that represents temporal changes in data.

4 Claims, 6 Drawing Sheets

(51) Int. Cl.
*G06N 5/02* (2006.01)
*G06F 17/16* (2006.01)

(56) References Cited

U.S. PATENT DOCUMENTS

| 2018/0068224 | A1* | 3/2018 | Chen | G06N 5/02 |
| 2018/0211182 | A1* | 7/2018 | Lei | G06N 20/00 |
| 2022/0129734 | A1* | 4/2022 | Kurasawa | G06Q 40/08 |

OTHER PUBLICATIONS

Masaya Murata, Noriko Takaya, Yusuke Ichikawa, Tadasu Uchiyama, "Sales Simulation for E-Commerce Marketing Plans", Academic Journal of The Japan Society for Industrial and Applied Mathematics, vol. 23, No. 2, 2013 (with partial translation).

Yosuke Suzuki et al., "Experimental Evaluation of Input Vector Complemention for Autoencoder-based Recommendation Systems", Dai 108 Kai Special Internet Group on Knowledge-based Software Shiryo (SIG-KBS-B504), Jun. 1, 2016 (Jun. 1, 2016), pp. 6 to 11 (with English Abstract).

International Search Report (in Japanese and English) issued in PCT/JP2017/030743, dated Nov. 14, 2017; ISA/JP.

Japanese Notice of Allowance regarding JP2018538357, dated Aug. 13, 2019.

Wong, Liang Ze et al. "Imputing missing values in sensory networks using sparse data representations", Modeling, Analysis and Simulation of Wireless and Mobile Systems, ACM, 2 Penn Plaza, Suite 701, New York, NY 10121-0701 USA, Sep. 21, 2014, pp. 227-230, XP058055826, DOI: 10.1145/2641798.2641816 IBSN: 978-1-4503-3030-5.

Extended European Search Report from counterpart EP178485967, dated May 26, 2020.

* cited by examiner

FIG. 3

SERIES "1"

| TIME | VALUE |
|------|-------|
| 10 | 20 |
| 11 | 21 |
| 12 | 24 |
| 14 | 28 |
| 17 | 19 |

SERIES "2"

| TIME | VALUE |
|------|-------|
| 11 | 22 |
| 14 | 25 |
| 18 | 19 |
| 20 | 10 |

. . .

SERIES "N"

| TIME | VALUE |
|------|-------|
| 4 | 2 |
| 8 | 6 |
| 12 | 7 |
| 16 | 7 |
| 20 | 3 |

FIG. 4

INPUT TIME-SERIES DATA LENGTH = 4 HOURS
OBSERVATION MINIMUM INTERVAL = 1 HOUR
FEATURE EXTRACTION SIZE = 2

TIME-SERIES DATA OF FEATURE EXTRACTION TARGET

| TIME | VALUE |
|---|---|
| 8 | 12 |
| 11 | 20 |

| EVENLY SPACED TIME-SERIES DATA | | | | OMISSION INFORMATION | | | |
|---|---|---|---|---|---|---|---|
| 1 | 2 | 3 | 4 | 1 | 2 | 3 | 4 |
| 12 | N/A | N/A | 20 | 1 | 0 | 0 | 1 |

TIME-SERIES-DATA FEATURE EXTRACTION DEVICE, TIME-SERIES-DATA FEATURE EXTRACTION METHOD AND TIME-SERIES-DATA FEATURE EXTRACTION PROGRAM

CROSS-REFERENCE TO RELATED APPLICATIONS

This application is a 371 U.S. National Stage of International Application No. PCT/JP2017/030743, filed on Aug. 28, 2017, which claims priority to Japanese Application No. 2016-174065, filed on Sep. 6, 2016. The entire disclosures of the above applications are incorporated herein by reference.

TECHNICAL FIELD

The present invention relates to a time-series-data feature extraction device, a time-series-data feature extraction method, and a time-series-data feature extraction program.

Priority is claimed on Japanese Patent Application No. 2016-174065, filed on Sep. 6, 2016, the contents of which are incorporated herein by reference.

BACKGROUND ART

Time-series data is data in which values observed by a sensor are converted into data while being kept in temporal order. It is often possible that time-series data cannot be observed (measured) for some reason, or is not observed (measured) at constant time intervals due to lost observed (measured) data. This type of time-series data is called unevenly spaced time-series data.

An example of unevenly spaced time-series data is as follows. In a group of records composed of "time" and "observation value of temperature", pairs of time and observation value are (10 o'clock, 20 degrees), (11 o'clock, 21 degrees), (12 o'clock, 24 degrees), (14 o'clock, 28 degrees), and (17 o'clock, 19 degrees). At this time, there are three observation time intervals of 1 hour, 2 hours, and 3 hours, which are not constant.

In an example of a situation in which unevenly spaced time-series data is generated, a phenomenon outlined below occurs in IoT (Internet of Things)/M2M (Machine to Machine) environments. That is to say, in some cases, observation may not be performed due to failure of a sensor terminal or battery exhaustion, or data may be lost due to network congestion. In such a case, it is difficult to obtain all observation data at constant time intervals. Also, with a system that is constantly attached to a person and observes biological information, the constant observation device is not always attached to the measurement target person due to their circumstances such as bathing, sleeping, and changing clothes. For this reason, measurement tends to be fragmented. Further, in data such as a specimen test in which human blood or urine are handled, it is influenced by the circumstances of the measurement target person and the measurement performer or the availability of the testing instrument. For this reason, it is difficult to keep the measurement time interval constant.

When performing an analysis such as classification by machine learning from unevenly spaced time-series data, it is necessary to extract a feature from unevenly spaced time-series data. Regarding feature extraction, in a first method, features irrespective of the time interval of observation data are extracted. In a second method, an omission estimation processing (interpolation or extrapolation) is performed so that the time interval is constant, and then features expressing changes over time are extracted. In a third method, temporal changes are modeled as a combination of fluctuation components according to a state space model, and then parameters of these fluctuation components are extracted as features. As described above, there are three methods for feature extraction.

Regarding the method for extracting feature irrespective of the time interval of observation data, examples of the features include a maximum value or a minimum value, an average, and a variance value. Although these features can roughly express states in a certain period, it is not possible to correctly express temporal changes.

Regarding the second method, examples of the omission estimation method include spline interpolation. In addition, examples of the feature that represents temporal changes include conversion to frequency components such as discrete Fourier transform and wavelet transform, and symbol conversion such as Symbolic Aggregate approximation (SAX) (Non-Patent Document 1). In the above example of unevenly spaced time-series data, when discrete Fourier transform is performed after the interpolation processing by a linear function, three records, namely (13 o'clock, 26 degrees), (15 o'clock, 25 degrees), and (16 o'clock, 22 degrees) are added by means of interpolation of the omission estimation processing, and then (185, $-15.778-4.121i$, $2-1i$, $0.222-0.121i$, 3, $0.222+0.121i$, $2+1i$, $-15.778+4.121i$) are obtained by discrete Fourier transform. In this method, the omission estimation process and the feature extraction are independent processes. Therefore, there is a problem that the feature is greatly influenced by the accuracy of the omission estimation processing. For example, if there is a large bias in the time intervals of the observation data, variation in the accuracy of the omission estimation processing also increases, and the features added with noise that is dependent on the time intervals of the observation data and the omission estimation processing are extracted as a result. In the above example, the temporal changes of the air temperature change during 3 hours from 14 o'clock to 17 o'clock are interpreted as a linear change as a result of the linear function interpolation, and this becomes the noise.

Regarding the third method, the state space model consists of a state model and an observation model. The state model assumes Markov property, and the current state is expressed as a function of past state, explanatory variable, and system noise. The observation model is expressed as a function of current state, explanatory variable, and observation noise. The state model is designed based on the fluctuation components assuming linear independence. Examples of fluctuation components include trend components, day-of-week fluctuation components of a one-week cycle, autoregressive processes, and self-damping processes (Non-Patent Document 2). In this method, it is difficult to extract features other than fluctuating components designed as state models, as features, and there is a problem that they are treated as noise.

PRIOR ART DOCUMENTS

Non-Patent Documents

[Non-Patent Document 1] Lin, J., Keogh, E., Lonardi, S. and Chiu, B. A Symbolic Representation of Time Series, with Implications for Streaming Algorithms. In proceedings of the 8th ACM SIGMOD Workshop on Research Issues in Data Mining and Knowledge Discovery. San Diego, Calif. 2003.

[Non-Patent document 2] Masaya Murata, Noriko Takaya, Yusuke Ichikawa, Tadasu Uchiyama, "Sales Simulation for E-Commerce Marketing Plans", Academic Journal of The Japan Society for Industrial and Applied Mathematics, Vol. 23, Issue 2, 2013.

SUMMARY OF INVENTION

Problem to be Solved by the Invention

As described above, in the conventional technique, depending on the accuracy of the omission estimation processing and the design of the fluctuation components, there is a problem in that the features representing temporal changes of the data cannot be correctly extracted from the time-series data observed at uneven intervals.

The present invention has been made in view of the above circumstances. An example of an object of the present invention is to provide a time-series-data feature extraction device that extracts features representing temporal changes in data from time-series-data observed at uneven intervals, a time-series-data feature extraction method, and a time-series-data feature extraction program.

Means for Solving the Problem

In order to solve the above problem, a time-series-data feature extraction device according to one aspect of the present invention includes: a training data receiving unit that receives an unevenly spaced time-series data group for training; a model design receiving unit that receives an input time-series data length, an observation minimum interval, and a feature extraction size; a data processing unit that processes the received unevenly spaced time-series-data group into an evenly spaced time-series-data group and an omission information group based on the received input time-series data length and the received minimum observation interval, the evenly spaced time-series-data group including omissions, and the omission information group indicating presence or absence of omissions; a model learning unit that learns a weight vector of each layer of a model with a difference being taken as an error, and stores the weight vector as a model parameter in a storage unit, the model being a model of a neural network including an input layer, an output layer, and an intermediate layer, a matrix obtained by combining the evenly spaced time-series-data group including omissions and the omission information group indicating presence or absence of omissions being input to the input layer, a matrix of an evenly spaced time-series-data group of an input time-series data length being output from the output layer, the received feature extraction size being the intermediate layer, and the difference being a difference between an element not missing in a matrix of the evenly spaced time-series-data group including omissions and an element of an output result of the output layer; and a feature extraction unit that receives time-series data of a feature extraction target, calculates a value of the intermediate layer of the model with use of the model parameter stored in the storage unit by inputting the received time-series data of the feature extraction target into the model, and outputs the calculated value of the intermediate layer as a feature that represents temporal changes in data.

In the time-series-data feature extraction device, the feature extraction unit may output the value of the intermediate layer together with the time-series data from which the feature has been extracted, and may output information of the difference between the element not missing in the matrix of the evenly spaced time-series-data group including omissions and the element of the output result of the output layer of the model.

A time-series data feature extraction method is a time-series data feature extraction method performed by a time-series data feature extraction device that extracts a feature of time-series data, and includes: receiving an unevenly spaced time-series data group for training; receiving an input time-series data length, an observation minimum interval, and a feature extraction size; processing the received unevenly spaced time-series-data group into an evenly spaced time-series-data group and an omission information group based on the received input time-series data length and the received minimum observation interval, the evenly spaced time-series-data group including omissions, and the omission information group indicating presence or absence of omissions; learning a weight vector of each layer of a model with a difference being taken as an error, and storing the weight vector as a model parameter in a storage unit, the model being a model of a neural network including an input layer, an output layer, and an intermediate layer, a matrix obtained by combining the evenly spaced time-series-data group including omissions and the omission information group indicating presence or absence of omissions being input to the input layer, a matrix of an evenly spaced time-series-data group of an input time-series data length being output from the output layer, the received feature extraction size being the intermediate layer, and the difference being a difference between an element not missing in a matrix of the evenly spaced time-series-data group including omissions and an element of an output result; receiving time-series data of a feature extraction target; calculating a value of the intermediate layer of the model with use of the model parameter stored in the storage unit by inputting the received time-series data of the feature extraction target into the model; and outputting the calculated value of the intermediate layer as a feature that represents temporal changes in data.

A time-series-data feature extraction program according to one aspect of the present invention is for causing a computer to function as the aforementioned time-series-data feature extraction device.

Effect of the Invention

According to the present invention, it is possible to obtain an advantageous effect that enables extraction of a feature representing temporal changes in data from time-series data observed at uneven intervals.

BRIEF DESCRIPTION OF THE DRAWINGS

FIG. 3 is an explanatory diagram showing an example of a time-series data group for training in the embodiment.

FIG. 4 is an explanatory diagram showing an example of an input time-series data length, an observation minimum interval, and a feature extraction size in the embodiment.

EMBODIMENTS FOR CARRYING OUT THE INVENTION

Hereinafter, an embodiment of the present invention will be described with reference to the drawings. A time-series-data feature extraction device of the present embodiment learns a model that outputs evenly spaced time-series-data from time-series data observed at uneven intervals, and outputs a value of an intermediate layer of the model as a feature, and a value representing the accuracy of feature extraction.

Figure 1:
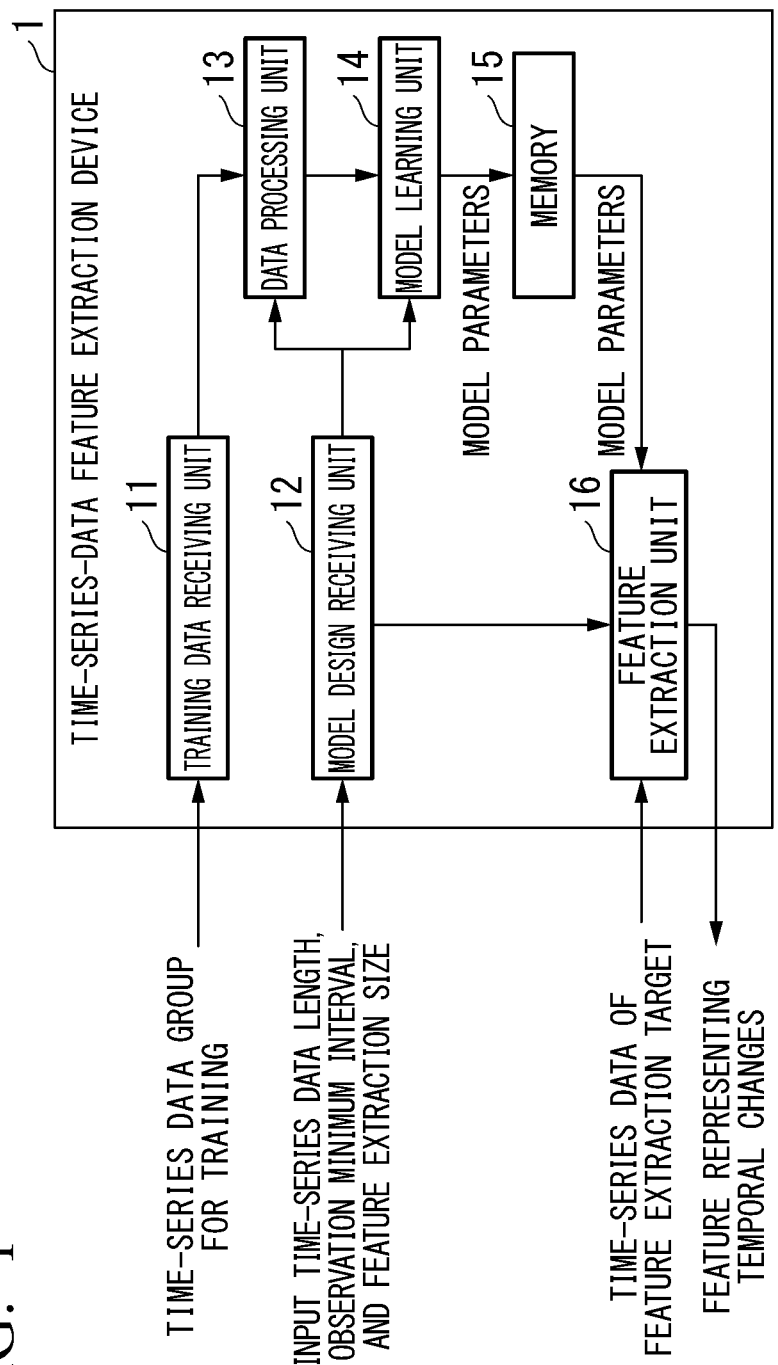
FIG. 1 is a configuration diagram showing an example of a time-series-data feature extraction device according to the present embodiment.

FIG. 1 is a block diagram of a time-series-data feature extraction device 1 according to the present embodiment. As shown in FIG. 1, the time-series-data feature extraction device 1 according to the embodiment of the present invention includes a training data receiving unit 11, a model design receiving unit 12, a data processing unit 13, a model learning unit 14, a memory 15, and a feature extraction unit 16.

The training data receiving unit 11 receives (receives an input of) an unevenly spaced time-series-data group for training. The model design receiving unit 12 receives (receives an input of) a time-series data length, an observation minimum interval, and a feature extraction size. The data processing unit 13 processes the unevenly spaced time-series-data group received by the training data receiving unit 11 into an evenly spaced time-series-data group including omissions, and an omission information group indicating the presence or absence of omissions, on the basis of the input time-series data length and the received minimum observation interval received by the model design receiving unit 12.

The model learning unit 14 takes a matrix obtained by combining the evenly spaced time-series-data group including omissions, and the omission information group indicating the presence or absence of omissions as an input to the input layer, and takes the matrix of the evenly spaced time-series-data group of the input time-series data length as an output from the output layer. For the model of a neural network in which the feature extraction size received by the model learning unit 12 is an intermediate layer, the model learning unit 14 learns a weight vector of each layer where a difference between an element not missing in the matrix of the evenly spaced time-series-data group including omissions, and an element of the output result of the output layer is taken as an error, and generates model parameters. The memory 15 stores the model parameters.

The feature extraction unit 16 receives the time-series data of the feature extraction target and takes the received time-series data as an input of the model. The feature extraction unit 16 calculates the value of the intermediate layer of the model using the stored model parameters, and outputs the feature representing the temporal changes of the data.

Figure 2:
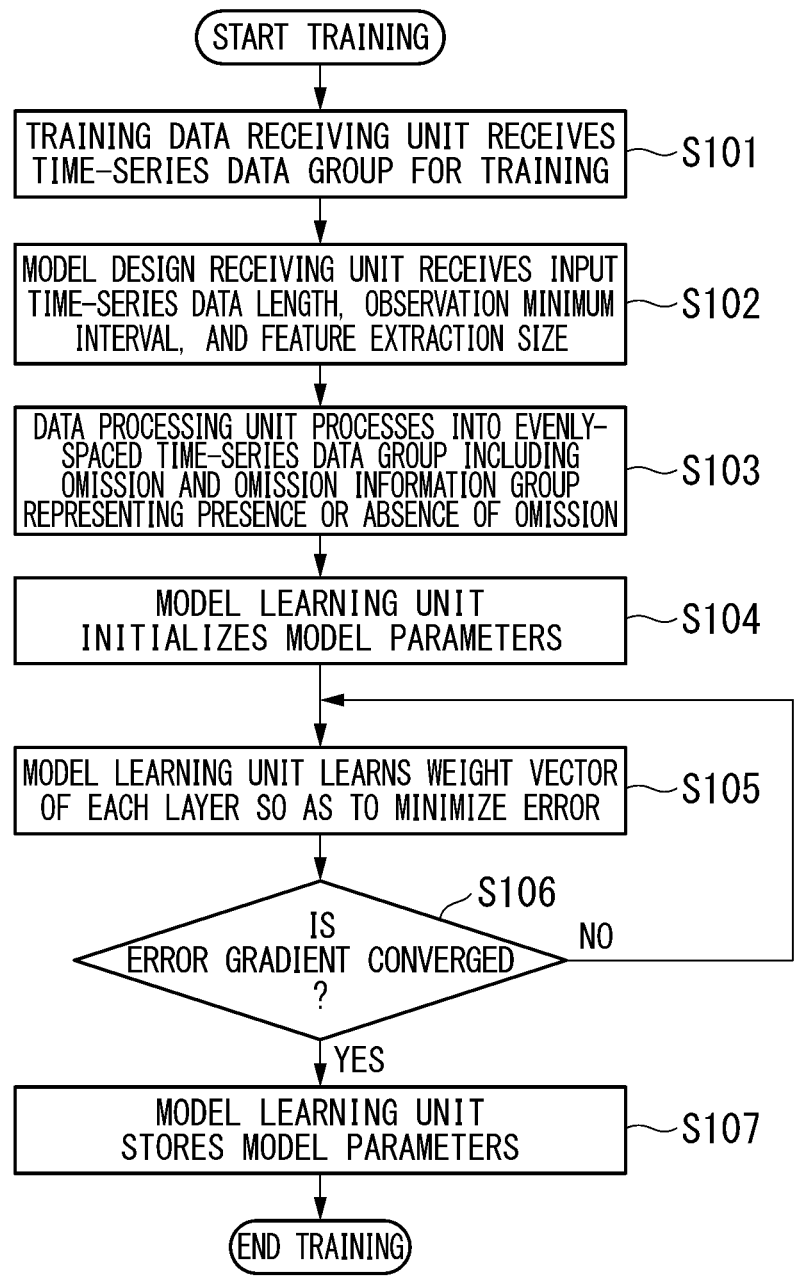
FIG. 2 is a flowchart showing an example of a training step in a time-series-data feature extraction method in the embodiment.

In the time-series-data feature extraction device 1 according to the present embodiment, in the training step, the unevenly spaced time-series-data group for training is received, the weight vector of each layer is learned, and the model parameters are generated. The memory 15 stores the model parameters. In the training step, the processing of steps S101 to S107 shown in FIG. 2 is executed.

The training data receiving unit 11 receives a time-series data group for training (Step S101). FIG. 3 shows an example of the time-series data group for training. In this example, the time-series data group for training consists of a total of N series (series "1" to "N"), and the pairs of time and observation value of series "1" are (10 o'clock, 20 degrees), (11 o'clock, 21 degrees), (12 o'clock, 24 degrees), (14 o'clock, 28 degrees), and (17 o'clock, 19 degrees).

Next, the model design receiving unit 12 receives a time-series data length, an observation minimum interval, and a feature extraction size (Step S102). FIG. 4 shows an example of the input time-series data length, the observation minimum interval, and the feature extraction size. In this example, the input time-series data length is 4 hours, the observation minimum interval is 1 hour, and the feature extraction size is "2". The input time-series data length, the observation minimum interval, and the feature extraction size can be set to arbitrary values.

Figure 5:
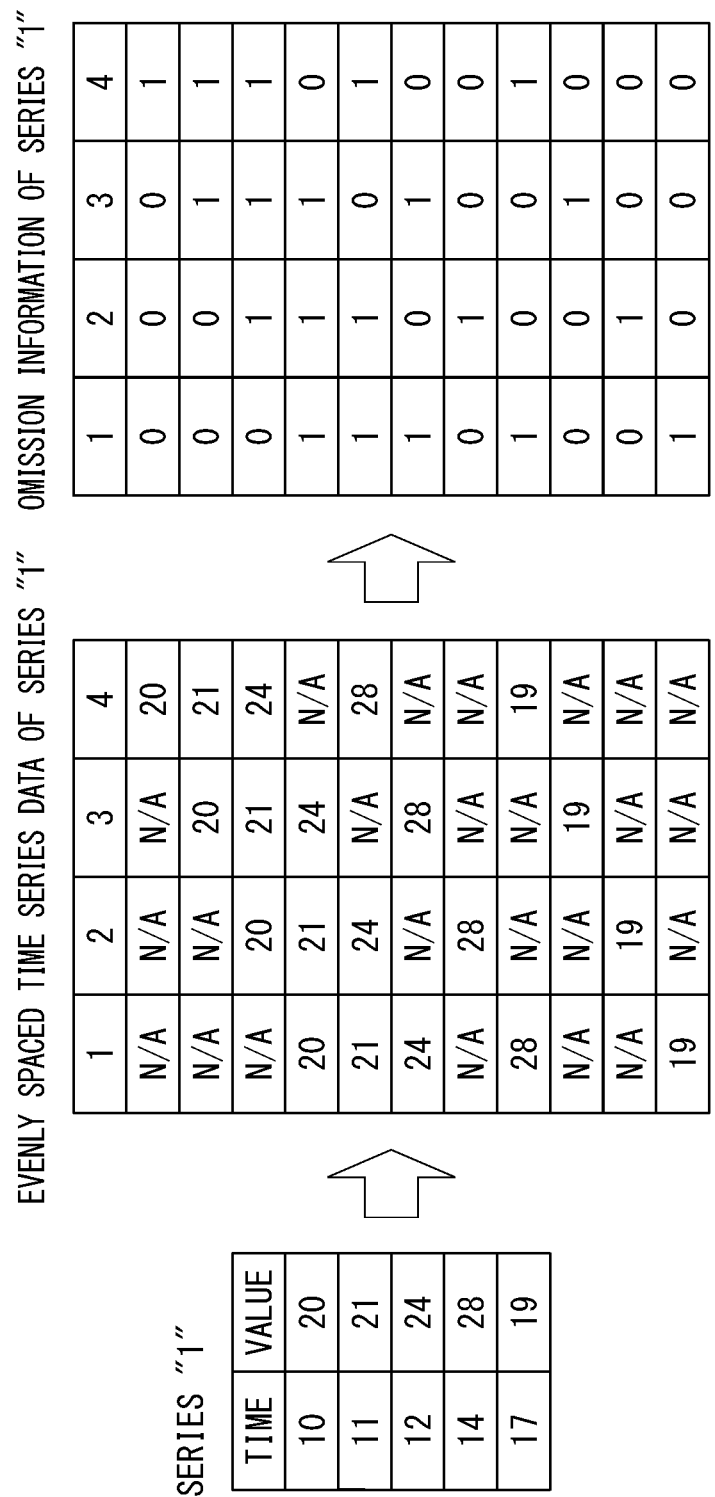
FIG. 5 is an explanatory diagram showing an example of evenly spaced time-series-data, and omission information, in the embodiment.

The data processing unit 13 processes the time-series data group for training into an evenly spaced time-series-data group including omissions, and an omission information group indicating the presence or absence of omissions (Step S103). FIG. 5 shows an example of the evenly spaced time-series-data, and omission information of the series "1". Here is described a case where data of the series "1" is acquired as shown in the portion (A) of FIG. 5. In this case, since the observation minimum interval was 1 hour, the series "1" is interpreted as missing 7 o'clock, 8 o'clock, 9 o'clock, 13 o'clock, 15 o'clock, and 16 o'clock. As shown in the portion (B) of FIG. 5, since the input time-series data length was 4 hours, the time-series data is delimited in units of 4 hours, such as 7 o'clock to 10 o'clock, 8 o'clock to 11 o'clock, and 9 o'clock to 12 o'clock, processed into evenly spaced time-series-data. As shown in the portion (C) of FIG. 5, at the same time as processing into the evenly spaced time-series-data, omission information that indicates "1" if no omission is made in the data and indicates "0" if omission is made in the data is also generated. The same processing is executed for each series of the time-series data group for training.

The model handled by the model learning unit 14 is a neural network. This model is a model composed of three or more layers that always has three layers of input layer, output layer, and intermediate layer. The input to the model learning unit 14 is information combining the evenly spaced time-series-data group including omissions (refer to the portion (B) in FIG. 5), and the omission information group indicating the presence or absence of omissions (refer to the portion (C) in FIG. 5). For this reason, the input layer has a size twice as long as the input time-series data length. In the example of FIG. 4, the input time-series data length was 4 hours, and the observation minimum interval was 1 hour. Therefore the size of the input layer is "8". The output layer of the model learning unit 14 is evenly spaced time-series-data of the input time-series data length. For this reason, the output layer has the size of the input time-series data length.

In the example of FIG. 4, the size of the output layer is "4". The intermediate layer is set to "2" in the example of FIG. 4 in order to set it to the feature extraction size received by the model design receiving unit 12.

Figure 6:
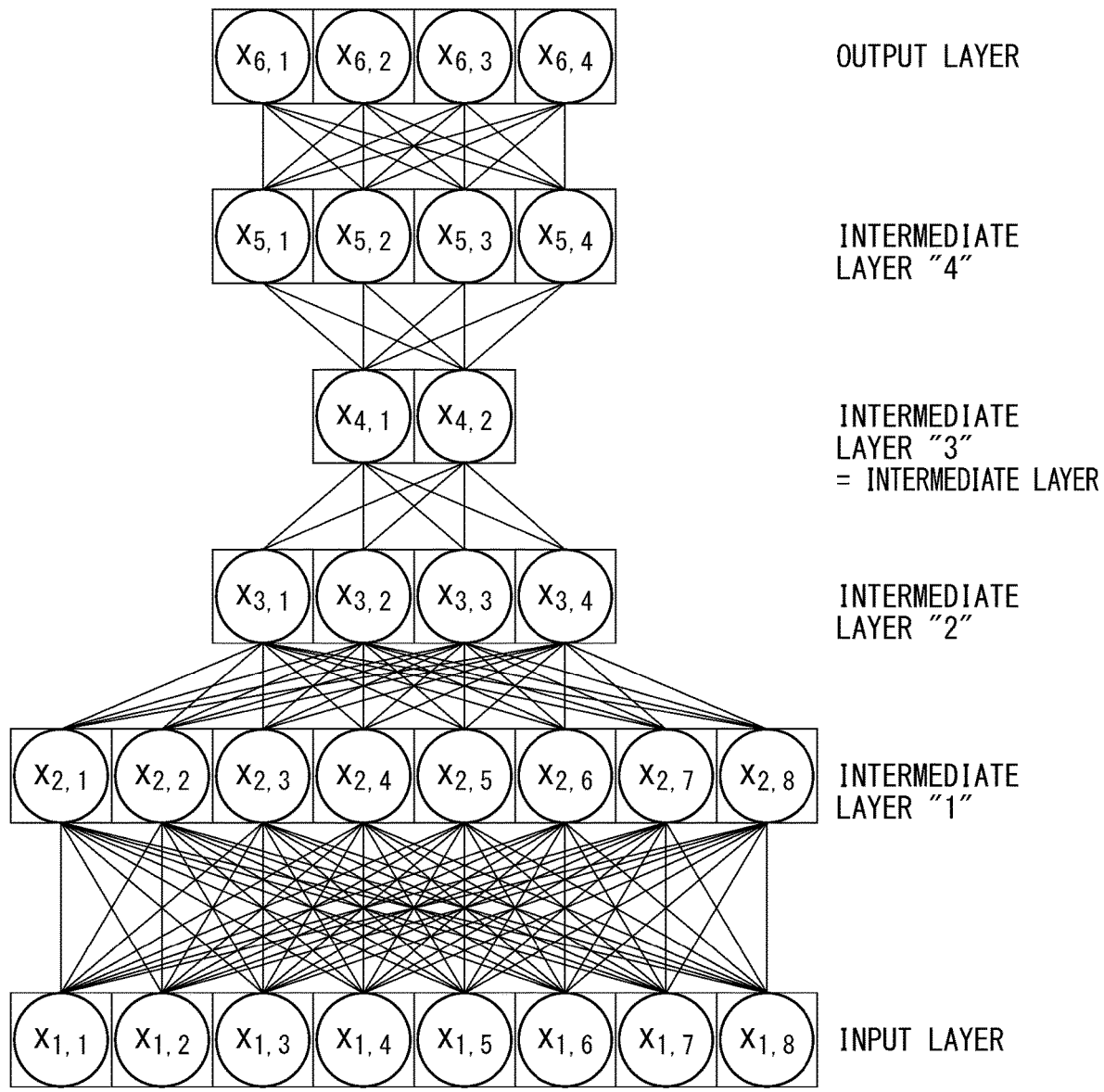
FIG. 6 is an explanatory diagram showing an example of a model in the embodiment.

FIG. 6 shows an example of a model handled by the model learning unit 14. This model is a model composed of an input layer, an output layer, and four intermediate layers. The value to the input layer is referred to as $X_1$, the value to the intermediate layer "1" as $X_2$, the value to the intermediate layer "2" as $X_3$, the value to the intermediate layer "3" as $X_4$, the value to the intermediate layer "4" as $X_5$, and the value to the output layer as $X_6$. The values $X_1$ to $X_6$ are represented by the following expressions (1a) to (1f), respectively.

$$X_1 = x_{1,1}, x_{1,2}, \ldots, x_{1,8} \quad (1a)$$

$$X_2 = x_{2,1}, x_{2,2}, \ldots, x_{2,8} \quad (1b)$$

$$X_3 = x_{3,1}, x_{3,2}, x_{3,3}, x_{3,4} \quad (1c)$$

$$X_4 = x_{4,1}, x_{4,2} \quad (1d)$$

$$X_5 = x_{5,1}, x_{5,2}, x_{5,3}, x_{5,4} \quad (1e)$$

$$X_6 = x_{6,1}, x_{6,2}, x_{6,3}, x_{6,4} \quad (1f)$$

In addition, the value of each layer is represented by a recurrence formula such as the following formula (2).

$$X_{i+1} = f_i(A_i X_i + B_i) \quad (2)$$

Here, $A_i$ is a weight parameter, $B_i$ is a bias parameter, and $f_i$ is an activation function.

In this example, the activation function consists of $f_1$, $f_3$, $f_4$, and $f_5$ of a linear combination (simple perceptron) and $f_2$ of ReLU (ramp function). The relationship between $f_1$, $f_3$, and $f_4$ is expressed by the following equation (3a). $f_2$ is expressed by the following equation (3b).

$$f_1(x) = f_3(x) = f_4(x) = f_5(x) = x \quad (3a)$$

$$f_2(x) = \max(0, x) \quad (3b)$$

The output value $X_6$ from the output layer is expressed by the following equation (4).

$$X_6 = (f_5(A_5(f_4(A_4(f_3(A_3(f_2(A_2(f_1(A_1 X_1 B_1)) + B_2)) + B_3)) + B_4)) + B_5)) \quad (4)$$

With respect to the model of the present embodiment, the configuration and size of the layer, and the activation function are not limited to the above examples. As another specific example, the activation function may be a step function, a sigmoid function, a polynomial equation, an absolute value, a maxout, a softsign, a softplus, or the like. With respect to the layer configuration, propagation from the intermediate layer one time point before, such as a recurrent neural network typified by Long short-term memory (LSTM), may be incorporated into the design.

Next, the model learning unit 14 initializes the model parameters (Step S104). A random value is assigned to the weight parameter $A_i$ of the model parameter and the bias parameter $B_i$ (i=1, 2, 3, 4, 5). Furthermore, "0" is assigned to the omission value of the evenly spaced time-series-data. In the present embodiment, "0" is assigned to the omission value, but it is not limited to this example. An average value, a median value, or an omission processing result may be assigned to the omission value.

Next, the model learning unit 14 learns the weight vector of each layer that constitutes the model so as to minimize the error (Step S105). Specifically, the evenly spaced time-series-data is referred to as P, the omission information is referred to as Q, and the data that combines the evenly spaced time-series-data group and the omission information group representing the presence or absence of omission is referred to as R. To the value $X_1$ for the input layer, there is input the data R obtained by combining the evenly spaced time-series-data group and the omission information group indicating the presence or absence of omission. Learning is performed so that the output value $X_6$ of the output layer (shown in Equation (4)) and the evenly spaced time-series-data P approach, without limit, to the value that is not omitted. The error function is calculated using the square error between the non-omitted value PQ of the evenly spaced time-series-data P and the non-omitted value $X_6 Q$ of the output layer as shown in Equation (5).

$$(X_6 Q - PQ)^2 \quad (5)$$

That is to say, with respect to the omission value of the evenly spaced time-series-data P, the value $X_6$ of the output layer taking any value is not taken into account for an error. Moreover, for the non-omitted value of the evenly spaced time-series-data P, it is aimed to learn so as to have the same value in the output layer value $X_6$, and an error function is designed. The model parameters are optimized by means of a gradient method so as to minimize the error. Adam is used as the gradient method. The gradient method in the present embodiment is not limited to this. As the gradient method, any method of probabilistic gradient descent such as SGD and AdaDelta may be used.

Next, the model learning unit 14 determines whether the gradient of the error has converged. If the gradient of the error has not converged (Step S106: No), the process returns to Step S105. If the gradient of the error has converged (Step S106: Yes), the optimization ends.

Next, the model learning unit 14 stores $A_i$ and $B_i$ (i=1, 2, 3, 4, 5) of the model parameters when the error gradient has converged (Step S107).

Figures 7, 8, 9:
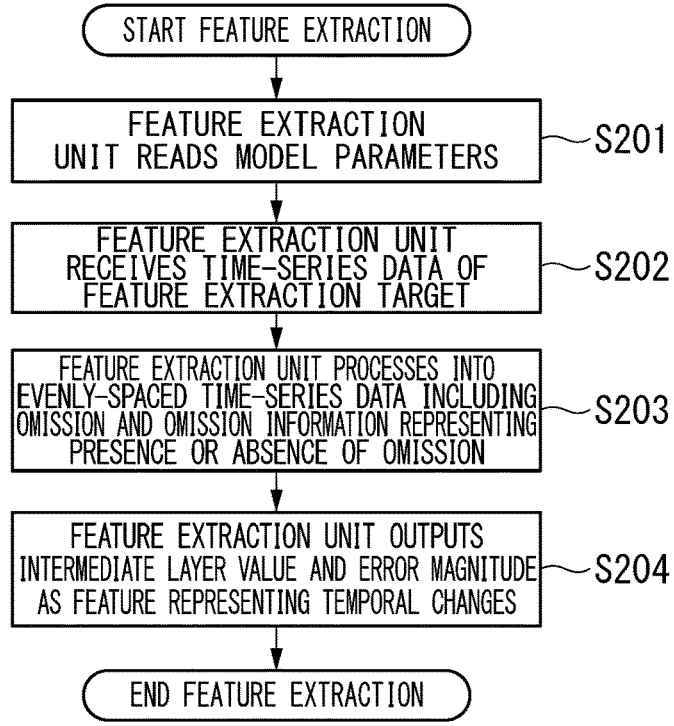
FIG. 7 is a flowchart showing an example of a feature extraction step in the time-series-data feature extraction method in the embodiment.
FIG. 8 is an explanatory diagram showing an example of time-series data of a feature extraction target in the embodiment.
FIG. 9 is an explanatory diagram showing an example of the processed time-series data of the feature extraction target, in the embodiment.

Next, the feature extraction processing is described. FIG. 7 is a flowchart of the feature extraction processing. In the feature extraction processing, steps S201 to S204 are executed.

First, the feature extraction unit 16 reads $A_i$ and $B_i$ (i=1, 2, 3, 4, 5) of the model parameters from the memory 15 (Step S201).

Next, the feature extraction unit 16 receives the time-series data of the feature extraction target. FIG. 8 shows an example of the time-series data of the feature extraction target.

The feature extraction unit 16 performs processing into the evenly spaced time-series-data including omissions, and the omission information indicating the presence or absence of omissions (Step S203). FIG. 9 shows an example of the processed time-series data of the feature extraction target. The evenly spaced time-series-data is referred to as P', the omission information indicating the presence or absence of omission is referred to as Q', and the information that combines the evenly spaced time-series-data group and the omission information group representing the presence or absence of omission is referred to as R'.

Next, the feature extraction unit 16 outputs the value of the intermediate layer and the magnitude of the error, as a feature representing temporal changes (Step S204). The value of the intermediate layer is as shown in Equation (6).

$$(f_3(A_3(f_2(A_2(f_1(A_1 R' + B_1)) + B_2)) + B_3)) \quad (6)$$

Moreover, the magnitude of the error between the element not missing in the matrix of the evenly spaced time-seriesdata group including omissions, and the element of the output result of the output layer of the model is expressed by the following equation (7).

$$((f_5(A_5(f_4(A_4(f_3(A_3(f_2(A_2(f_1(A_1R'+B_1))+B_2))+B_3))+B_4))+B_5))Q'-P'Q')^2 \quad (7)$$

As described above, in the present embodiment, it is possible to: convert the evenly spaced time-series-data group for training to an evenly spaced time-series-data group including omissions, and an omission information group indicating the presence or absence of omissions; learn, while taking these two as inputs, as a self-encoder in which an evenly spaced time-series-data group becomes an output; and output the value of the intermediate layer as a feature that represents temporal changes. That is to say, a feature that indicates temporal changes is extracted from the time-series data observed at uneven intervals without estimating omission, so that the influence of noise dependent on the omission estimation process can be mitigated. In addition, expressive learning is performed by means of a self-encoder, so that the influence of exhaustivity of fluctuation components in model designing can also be mitigated. Furthermore, when the size of the intermediate layer of the model is smaller than the input time-series data length, it is also possible to extract a feature expressed as low ranking.

The feature extraction unit 16 may output the value of the intermediate layer together with the time-series data from which the feature has been extracted, and may output information of the difference between the element not missing in the matrix of the evenly spaced time-series-data group including omissions, and the element of the output result of the output layer of the model. By restoring the time-series data observed at uneven intervals from the feature representing the temporal changes of the data and outputting the magnitude of the difference from the original time-series data as a new feature, it is possible to analyze unevenly spaced time-series data that takes account of the accuracy of the feature extraction of the temporal changes in the data. Furthermore, it can be used for an analysis as an index that indicates whether the feature representing temporal changes sufficiently expresses the original time-series data.

According to this configuration, in extracting a feature that represents temporal changes in data from time-series data observed at uneven intervals, then by collectively processing the omission estimation process and the feature extraction, the accuracy of the omission estimation processing is prevented from significantly influencing the feature, and the accuracy of analysis such as classification by means of machine learning is improved. Moreover, it is possible to realize an analysis such as classification by means of high accuracy machine learning from unevenly spaced time-series data, which is data in which values observed by a sensor are converted into data while being kept in temporal order, where time-series data is not observed (measured) for some reason or time-series data is not observed at constant time intervals due to lost observed (measured) data.

A program for realizing all or a part of the functions of the time-series-data feature extraction device 1 may be recorded on a computer-readable recording medium, and processing of each unit may be performed by having the program recorded on the recording medium read and executed on a computer system. The "computer system" referred to here includes an OS and hardware such as peripheral devices.

The "computer system" also includes a homepage provision environment (or displaying environment) when a WWW system is in use.

The "computer-readable recording medium" includes a portable medium such as a flexible disk, a magneto-optical disk, a ROM, and a CD-ROM, and a storage device such as a hard disk built in a computer system. Furthermore, the "computer-readable recording medium" also includes ones that dynamically hold a program for a short period of time such as a communication line in the case of transmitting a program via a network such as the Internet or a communication line such as a telephone line, and ones that hold a program for a certain period of time, such as a volatile memory inside a computer system serving as a server or a client in that case. Moreover, the program mentioned above may be for realizing a part of the above-described functions, and may be capable of realizing the above-described functions in combination with a program already recorded in the computer system.

Although the embodiment of the present invention has been described above in detail with reference to the drawings, specific configurations are not limited to this embodiment, and design changes and the like may be made without departing from the scope of the present invention.

INDUSTRIAL APPLICABILITY

The present invention may be applied to a time-series-data feature extraction device, a time-series-data feature extraction method, and a time-series-data feature extraction program.

REFERENCE SYMBOLS

11 Training data receiving unit
12 Model design receiving unit
13 Data processing unit
14 Model learning unit
15 Memory
16 Feature extraction unit

The invention claimed is:
1. A time-series-data feature extraction device comprising:
a training data receiving unit that receives an unevenly spaced time-series data group for training;
a model design receiving unit that receives an input time-series data length, an observation minimum interval, and a feature extraction size;
a data processing unit that processes the received unevenly spaced time-series-data group into an evenly spaced time-series-data group and an omission information group based on the received input time-series data length and the received minimum observation interval, the evenly spaced time-series-data group including omissions, and the omission information group indicating presence or absence of omissions;
a model learning unit that learns a weight vector of each layer of a model with a difference being taken as an error, and stores the weight vector as a model parameter in a storage unit, the model being a model of a neural network including an input layer, an output layer, and an intermediate layer, a matrix obtained by combining the evenly spaced time-series-data group including omissions and the omission information group indicating presence or absence of omissions being input to the input layer, a matrix of an evenly spaced time-series-data group of an input time-series data length being output from the output layer, the received feature extraction size being the intermediate layer, and the difference being a difference between an element not missing in a matrix of the evenly spaced time-series-data group including omissions and an element of an output result of the output layer; and a feature extraction unit that receives time-series data of a feature extraction target, calculates a value of the intermediate layer of the model with use of the model parameter stored in the storage unit by inputting the received time-series data of the feature extraction target into the model, and outputs the calculated value of the intermediate layer as a feature that represents temporal changes in data.

2. The time-series-data feature extraction device according to claim 1, wherein the feature extraction unit outputs the value of the intermediate layer together with the time-series data from which the feature has been extracted, and outputs information of the difference between the element not missing in the matrix of the evenly spaced time-series-data group including omissions and the element of the output result of the output layer of the model.

3. A time-series data feature extraction method performed by a time-series data feature extraction device that extracts a feature of time-series data, the method comprising:

receiving an unevenly spaced time-series data group for training;

receiving an input time-series data length, an observation minimum interval, and a feature extraction size;

processing the received unevenly spaced time-series-data group into an evenly spaced time-series-data group and an omission information group based on the received input time-series data length and the received minimum observation interval, the evenly spaced time-series-data group including omissions, and the omission information group indicating presence or absence of omissions;

learning a weight vector of each layer of a model with a difference being taken as an error, and storing the weight vector as a model parameter in a storage unit, the model being a model of a neural network including an input layer, an output layer, and an intermediate layer, a matrix obtained by combining the evenly spaced time-series-data group including omissions and the omission information group indicating presence or absence of omissions being input to the input layer, a matrix of an evenly spaced time-series-data group of an input time-series data length being output from the output layer, the received feature extraction size being the intermediate layer, and the difference being a difference between an element not missing in a matrix of the evenly spaced time-series-data group including omissions and an element of an output result;

receiving time-series data of a feature extraction target;

calculating a value of the intermediate layer of the model with use of the model parameter stored in the storage unit by inputting the received time-series data of the feature extraction target into the model; and outputting the calculated value of the intermediate layer as a feature that represents temporal changes in data.

4. A non-transitory computer-readable recording medium storing a time-series-data feature extraction program for causing a computer to function as the time-series-data feature extraction device according to claim 1.

* * * * *